United States Patent
Ogram

(10) Patent No.: US 10,159,203 B1
(45) Date of Patent: Dec. 25, 2018

(54) IRRIGATION SYSTEM

(71) Applicant: Mark E. Ogram, Tucson, AZ (US)

(72) Inventor: Mark E. Ogram, Tucson, AZ (US)

(*) Notice: Subject to any disclaimer, the term of this patent is extended or adjusted under 35 U.S.C. 154(b) by 0 days.

(21) Appl. No.: 15/732,479

(22) Filed: Nov. 16, 2017

(51) Int. Cl.
A01G 25/06 (2006.01)
A01G 29/00 (2006.01)
B05B 1/20 (2006.01)
A01G 25/16 (2006.01)

(52) U.S. Cl.
CPC ............. *A01G 25/06* (2013.01); *A01G 25/16* (2013.01); *A01G 29/00* (2013.01); *B05B 1/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,307,360 A * | 3/1967 | Bailly | ............... | A01G 25/06 405/38 |
| 4,538,377 A * | 9/1985 | Thornton | ............... | A01G 25/06 405/39 |
| 2002/0141828 A1* | 10/2002 | Wachtel | ............... | A01G 25/06 405/130 |
| 2011/0058900 A1* | 3/2011 | Furukawa | ............... | A01G 25/06 405/43 |
| 2012/0006738 A1* | 1/2012 | Harrison | ............... | E03B 3/03 210/257.1 |
| 2014/0064852 A1* | 3/2014 | Livvix | ............... | A01G 25/06 405/51 |
| 2017/0000044 A1* | 1/2017 | Palmer | ............... | A01G 9/0291 |
| 2018/0014476 A1* | 1/2018 | Shah | ............... | A01G 25/00 |

* cited by examiner

*Primary Examiner* — Kyle Armstrong

(57) ABSTRACT

An irrigation system which is adapted to provide selective irrigation directly to the roots of plants. In the preferred embodiment an underground housing is used to contain the pump and control mechanism. Extending from the housing is a grouping of water permeable pipes or reservoirs which are separated from the surface and each other by water barriers. The water barriers restrict water flow therethrough but are adapted to permit roots from the plants to pass therethrough.

18 Claims, 4 Drawing Sheets

IRRIGATION SYSTEM

BACKGROUND OF THE INVENTION

This invention relates water conservation and more particularly to irrigation of plants.

There is a looming water shortage around the world. This shortage is caused either directly or indirectly by an ever-increasing human population. Directly through water consumption either as refreshment or sanitary/cleaning purposes. Indirectly in the production of food crops or animals.

Crops require a great deal of water, whether the crops are irrigated through flood irrigating or through sprinklers. Sprinklers lose a tremendous amount of water through evaporation even before the water reaches the ground, and then on the ground only a small portion is needed by the crop.

Flood irrigation is also highly inefficient as the surface water tends to evaporate. These problems are only increased in warm environments.

It is clear there is a need for improved irrigation systems.

SUMMARY OF THE INVENTION

The invention, in its basic form, provides for an underground pipe which is separated from the soil surface by a water barrier. Sections of the pipe are adapted to "ooze" water therethrough. The water barrier prevents or discourages this water from traveling from the pipe to the surface; yet the water is available for the roots of the plant which pass through the water barrier. In this way, the unused water which is not taken up by the roots, is returned to the aquifer. The plants in this way are selectively irrigated without evaporation from the surface of the soil.

Various barriers are well known to those of ordinary skill in the art, including, but not limited to: U.S. Pat. No. 5,938,372, issued on Aug. 17, 1999, to Lichfield and entitled "Subsurface Irrigation Apparatus and Method"; U.S. Pat. No. 7,040,839, issued May 9, 2006, to Mazzei and entitled "Subsurface Irrigation of Plants, Trees and Landscape with Water Containing Gas Micro-Bubbles"; and U.S. Pat. No. 8,192,109, issued Jun. 5, 2012, to AlSaffer and entitled "Subsurface Irrigation System", all of which are incorporated hereinto by reference.

The barrier is ideally established using water absorbing polymers which are deposited as a layer between the underground pipe and the soil surface. As these polymers absorb water from the oozing of water by the pipe, the polymers expand; thereby filling the voids within the soil to curtail the avenues for the water to reach the soil surface.

The polymers, while establishing a barrier for the water, do not stop the plant's roots from penetrating the polymer barrier to reach the underlying water.

Those of ordinary skill in the art readily recognize a variety of polymers which may be used in this context, including, but not limited to those described in: U.S. Pat. No. 7,838,567, issued Nov. 23, 2010, to Champ et al. entitled "Foams Made From Water-Absorbing, Basic Polymers, Method for the Production and Utilization thereof"; U.S. Pat. No. 7,008,618, issued Mar. 7, 2006, to Hessefort et al. entitled "Water Soluble Monomers and Polymers for Protecting Substrates from Ultraviolet Light"; U.S. Pat. No. 6,623,645, issued Sep. 23, 2003, to Roach et al. entitled "Wastewater Containment and Treatment Methods"; U.S. Pat. No. 6,136,873, issued Oct. 24, 2000, to Hahule et al. entitled "Water-Absorbing, Expanded, Crosslinked Polymers, the Production and Use Thereof; U.S. Pat. No. 6,403, 700, issued Jun. 11, 2002, to Dahmen et al. entitled "Absorbing Agents for Water and Aqueous Liquids and Process for Their Production and Use"; and U.S. Pat. No. 9,790,374, issued Oct. 17, 2017, to Chen and entitled "Aqueous Cross-Linking Compositions and Methods", all of which are incorporated hereinto by reference.

While the above discussion relates to a single pipe and a single water barrier, the invention is not intended to be so limited as the preferred embodiment provides sequentially deepening layers of pipes and water barriers. In this embodiment, as the plants mature, the irrigation moves to lower pipes to draw the roots of the plant go deeper, always providing an incentive for the root growth.

In one embodiment, the water going into the pipe has been enhanced using fertilizer. Again, the invention provides for not only selective watering of the plant but also selective fertilization; thereby conserving both water and fertilizer.

The preferred embodiment of the invention uses an underground housing for a pump and the control mechanism. While the ideal housing is without surface access, other embodiments create a housing into which an operator may enter the housing for repairs or operational control.

From the housing, numerous underground pipes extend and provide a layering wherein the irrigation is provided in progressively deeper. Both ends of the pipes are accessible within the housing. Water barriers are established between each of the pipe layers and an additional water barrier is provided above the entire group of pipes. In this way, progressively deeper strata are irrigated without the water gaining access to the surface to needlessly evaporate.

The pipes are either designed so that selected portions are capable of allowing water to pass into the surrounding ground ("ooze") or reservoirs acting as ollas are placed to provide for the roots.

A water pump and well are located within the underground housing and adapted to draw water from an aquifer which is then delivered to the one end of the pipe of the chosen strata. The water passes through the pipe to ooze water and any excess passed back to the housing via the opposing end of the pipe. This excess water is dumped into the aquifer.

Ideally, a control mechanism permits the operator to select which layers are to be irrigated. This is accomplished through the activation of selected valves. This control mechanism is ideally above ground although some embodiments have the control mechanism within the underground housing.

A variety of control mechanisms with remotely controlled valves are obvious to those of ordinary skill in the art, including but not limited to: U.S. Pat. No. 9,081,376, issued Jul. 14, 2015, to Woytowitz and entitled "Hybrid Modular/Decoder Irrigation Controller"; U.S. Pat. No. 9,578,817, issued Feb. 28, 2017, to Dunn et al. and entitled "Valve-in-Head Irrigation Sprinkler with Service Valve"; U.S. Pat. No. 9,739,394, issued Aug. 22, 2017, to Fujita, et al. and entitled "Solenoid Valve"; U.S. Pat. No. 9,797,252, issued Oct. 24, 2017, to Stein et al. and entitled ""Fluid Working Machine with Valve Actuator and Method for Controlling the Same"; and, U.S. Pat. No. 9,802,764, issued Oct. 31, 2017, to Burk, and entitled "Remotely Operated Hydraulic System", all of which are incorporated hereinto by reference.

In the preferred embodiment, solar power is used to power the pump and the control mechanism. to a selected first end of the underground pipes, all of the second ends communicate the unused water to the aquifer.

The invention, together with various embodiments of the invention will be more fully explained by the accompanying drawings and the following description thereof.

DRAWINGS IN BRIEF

DRAWINGS IN DETAIL

Figure 1:
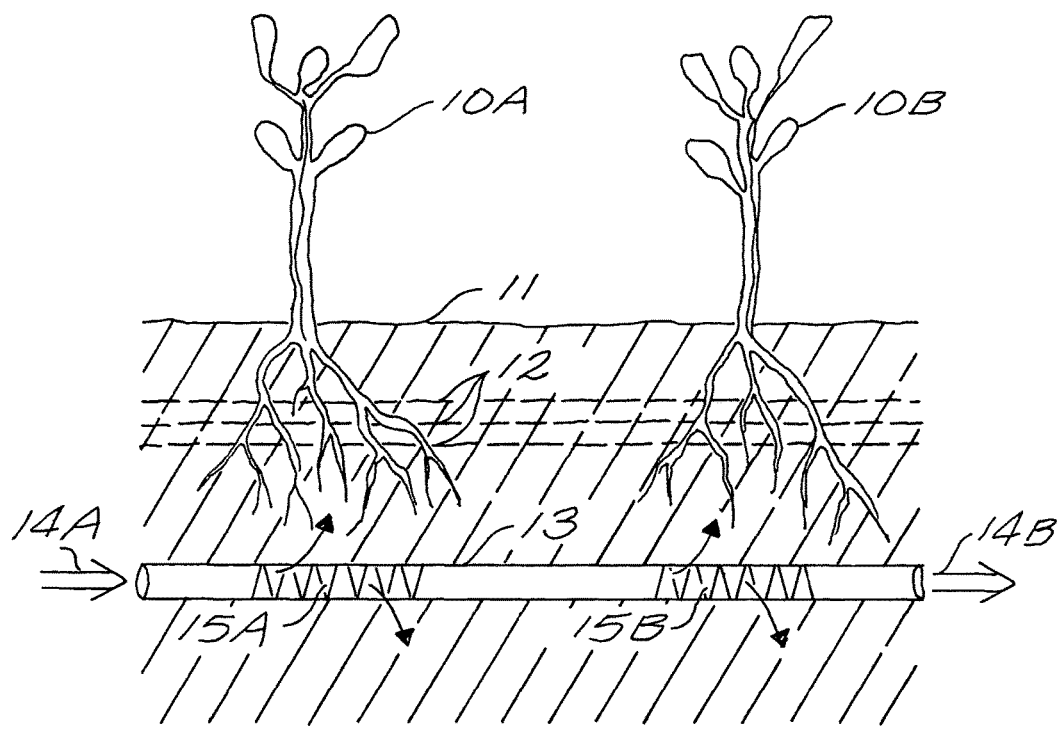
FIG. 1 illustrates an embodiment of the invention using a single pipe.

FIG. 1 illustrates an embodiment of the invention using a single pipe. As shown in this embodiment, pipe 13 is buried below soil surface 11 and barrier 12. Barrier 12 is a water absorbing polymer.

Water 14A passes through pipe 13 (to exit 14B) and past emitter portions 15A and 15B. Although this illustration shows the emitters (15A and 15B) in sections of pipe 13, in other embodiments, substantially the entire pipe is used to ooze water.

The emitted water soaks into the surrounding soil which wicks the water upward to soak polymer barrier 12. The polymer expands, filling gaps in the soil, to create a barrier for the emitted water; thereby, preventing the water from reaching soil surface 11 where it would be susceptible to evaporation.

The plants' 10A and 10B root system is able to penetrate barrier 12 to reach the water.

As illustrated, the totality of the water is either applied in this illustration provide to the roots of plants 10A and 10B or is returned through seepage to aquifer.

In another embodiment, as will be shown and explained in FIGS. 3A and 3B, a second barrier is positioned below pipe 13 to prevent or hinder seepage to the aquifer. The water is then contained between the two barriers to form an artificial water table.

The depth of pipe 13 and barrier 12 is established by the root depth of plants 10A and 10B.

Note that the only water exposed to the environment above the soil surface is that contained with plants 10A and 10B. No surface water exists. The irrigation of the invention targets only the plant.

Figure 2:
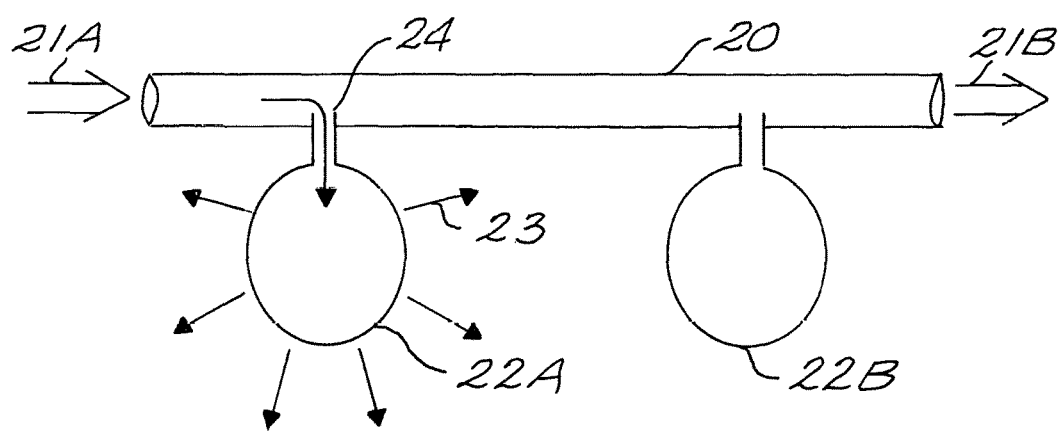
FIG. 2 illustrates the embodiment using water permeable clay.

FIG. 2 illustrates the embodiment using water permeable clay. As before water 21A passes through pipe 20 to exit 21B. Clay pots or ollas 22A and 22B are filled with water via openings such as 24. The water within the clay pot 22A seeps through the walls of the clay pot 22A as illustrated by arrows 23.

As with FIG. 1, located above pipe 20 is a barrier to water (not shown).

In operation, water is passed through pipe 20 until the operator sees that all the clay pots (22A and 22B) have been filled. The clay pots are filled when water is flows 21B from pipe 20.

Figure 3A:
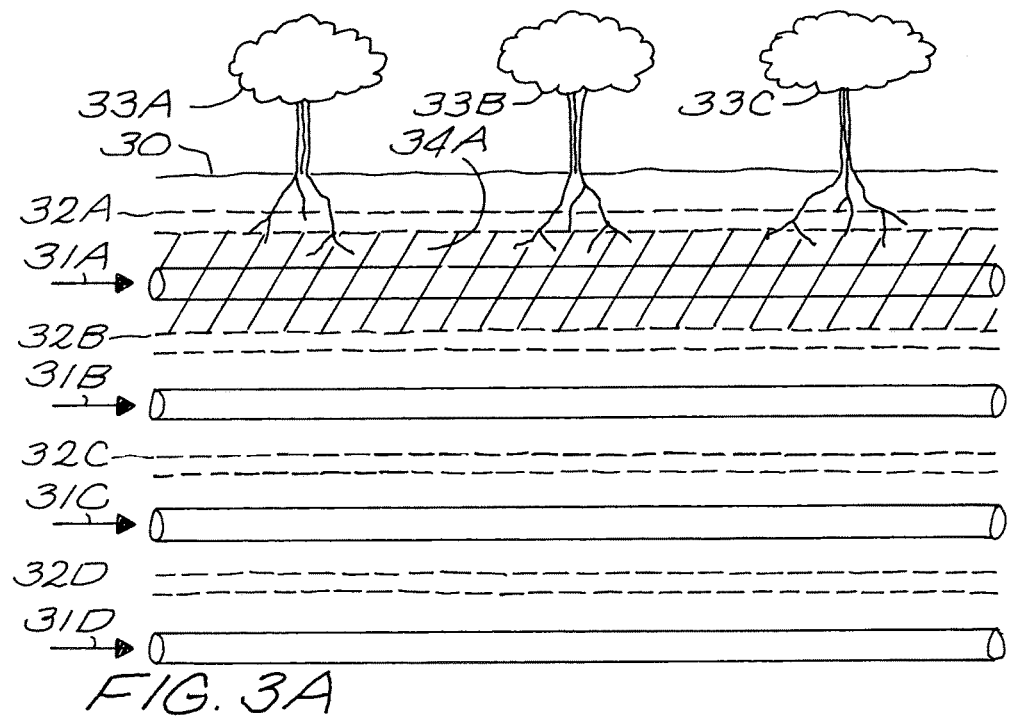
FIGS. 3A and 3B illustrate the use of the invention to draw the roots deeper into the soil.
Figure 3B:
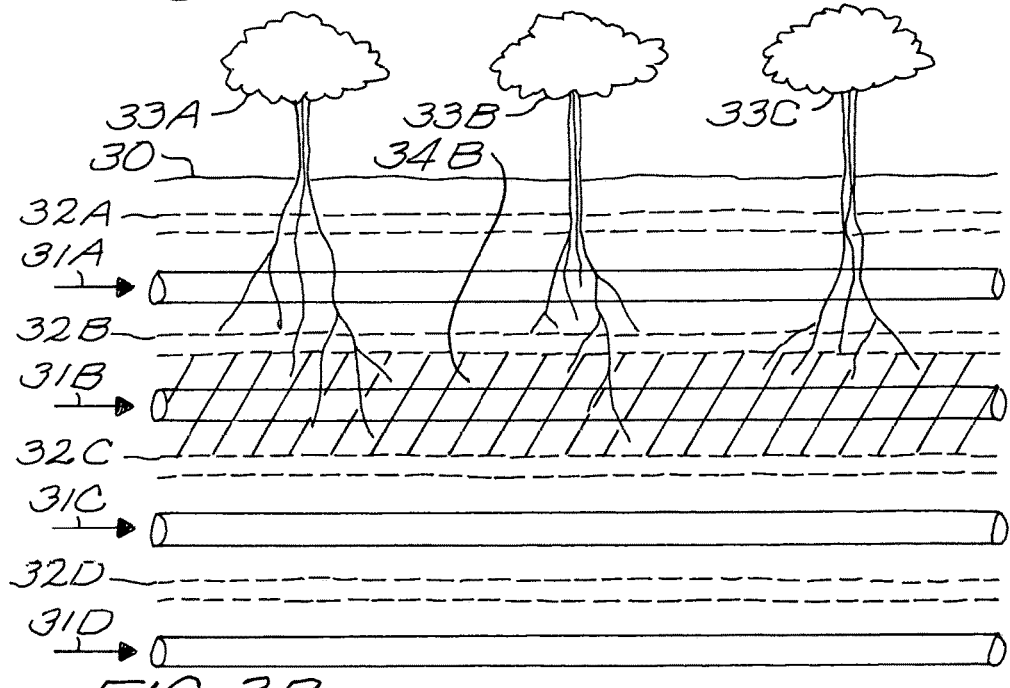

FIGS. 3A and 3B illustrate the use of the invention to draw the roots deeper into the soil.

Referring to FIG. 3A, young trees 33A, 33B, and 33C have been planted into soil 30. Buried beneath is a series of barriers (32A-32D) with pipes (31A-31D) interposed therebetween as illustrated. For the young trees with limited root depth, water is put into pipe 31A. Note, in this illustration, pipes 31A-31D are all capable of oozing the water. This creates an "artificial water table" 34A between barrier 32A and 32B. No water is applied to pipes 31B-31D.

Referring to FIG. 3B, trees 33A, 33B, and 33C have matured with their root drawing deeper into soil 30. The depth of the roots is established by the height of trees 33A-33C together with the type of tree (or plant) involved.

To further encourage the extension of the roots of trees 33A-33C, no water is provided to pipe 31A. Water is applied to pipe 31B to create the artificial water table 34B.

By successively creating artificial water tables deeper into the soil, the roots from the trees 33A-33C are drawn to the desired depth.

The present invention is also useful for field crops. In the case of field crops such as wheat, alfalfa, grasses, and the like, the piping and barriers are established before the field is planted. Ideally, the uppermost water barrier is deeper than any preparation such as disking or ripping. Using traditional irrigation methods (e.g. flood or sprinkler), the seeds are germinated and raised to a state where their roots are capable of reaching the artificial water table which the pipe/barrier arrangement creates.

Another advantage of the present irrigation system is that for deep rooted crop such as citrus and fruit trees, once the roots have been extended, the water from the artificial water tables is beyond the reach of most "weeds". The weeds simply cannot exist in the dry top portion. There is little or no weeding required of a mature grove making this system even more economical.

Figure 4A:
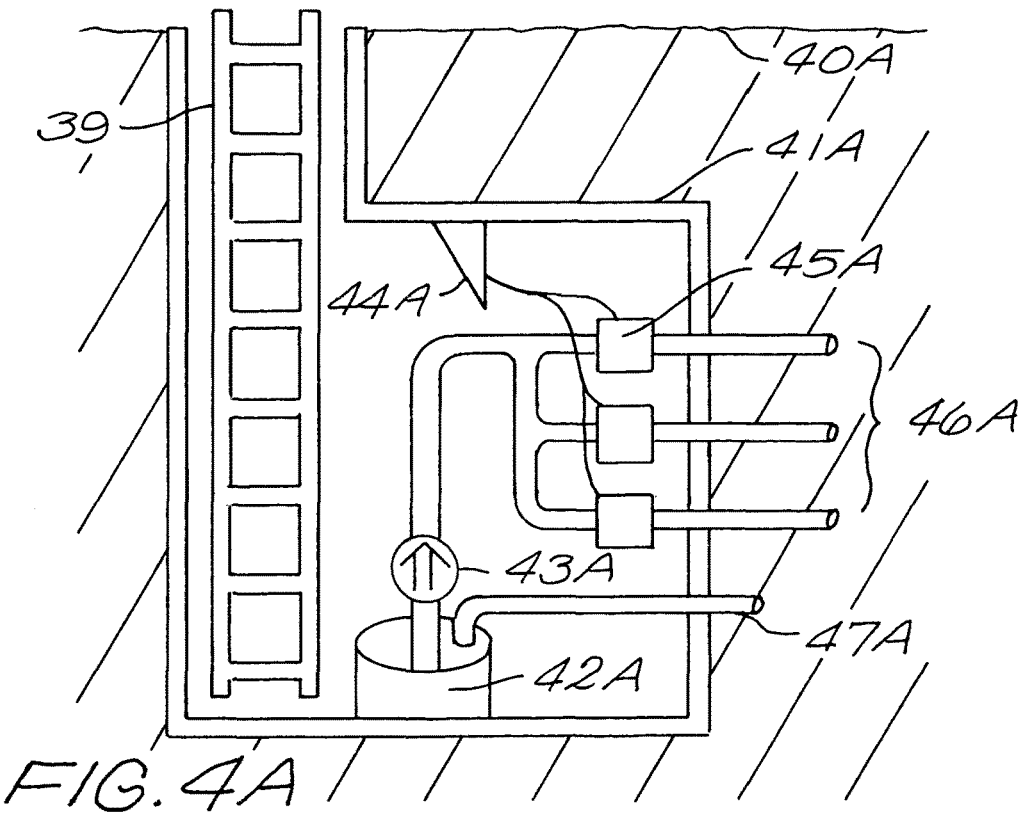
FIGS. 4A and 4B illustrate two embodiments of housing used for the pumping and control structure.
Figure 4B:
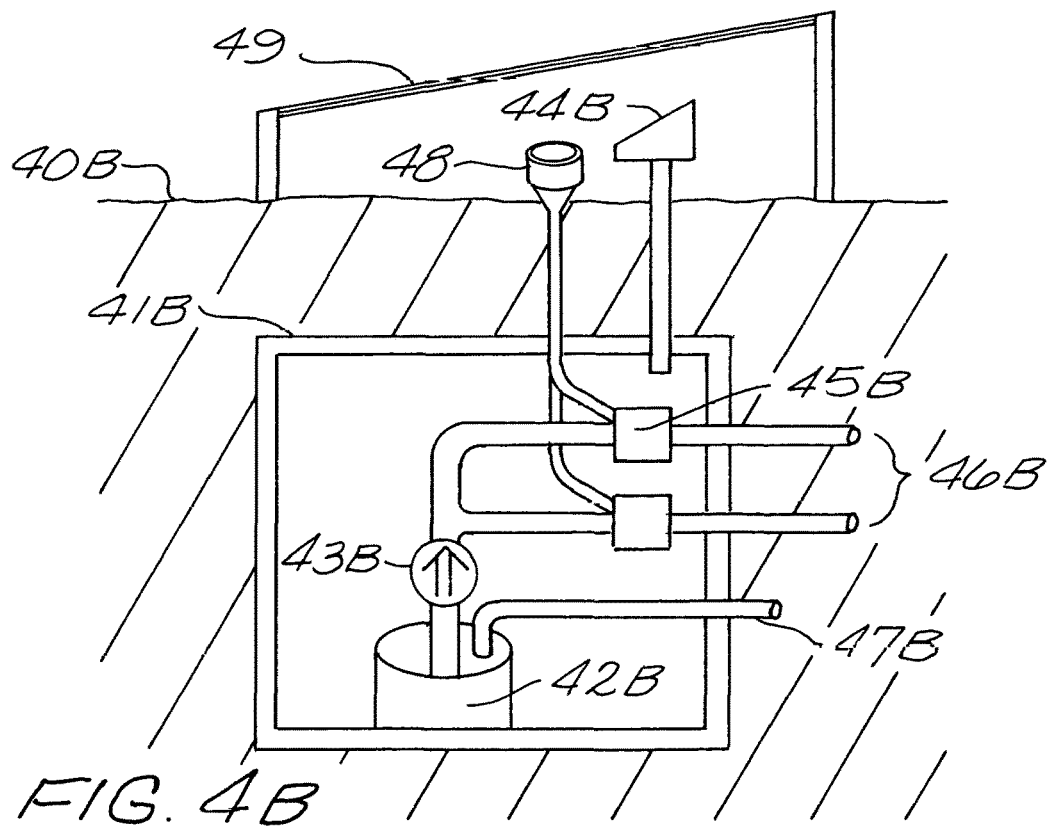

FIGS. 4A and 4B illustrate two embodiments of the pumping and control structure.

Although the invention contemplates an above ground control building, the preferred embodiment employs an underground housing. This preferred housing Is either operator accessible (FIG. 4A) or is buried with a telescoping operator panel (FIG. 4B).

Referring to FIG. 4A, housing 41A is buried in the ground 40A and is accessible via ladder 39. Within housing 41A is well 42A. Water from the aquifer is drawn by pump 43A and communicated to remote switch 45A. Control panel 44A allows the operator to select which remote control switches 45A is to be activated to permit water to pass through to a selected one of the pipes 46A. Excess water 47A, after it has passed through a pipe, is deposited into aquifer via well 42A.

In FIG. 4B, housing 41B is not accessible to an operator and is totally buried in soil 40B. As with housing 41A, pump 43B draws water from well 46B, this water is communicated to valves 45B which are selectively activated to pass water into pipes 46B. Excess water 47B is returned to the aquifer via well 42B.

In this embodiment, the control panel 44B is located above ground and power is provided by solar panels 49.

Additionally, dispenser 48 communicates fertilizer to the remotely controlled valves 45B allowing water flow to be enhanced with fertilizer.

Figure 5:
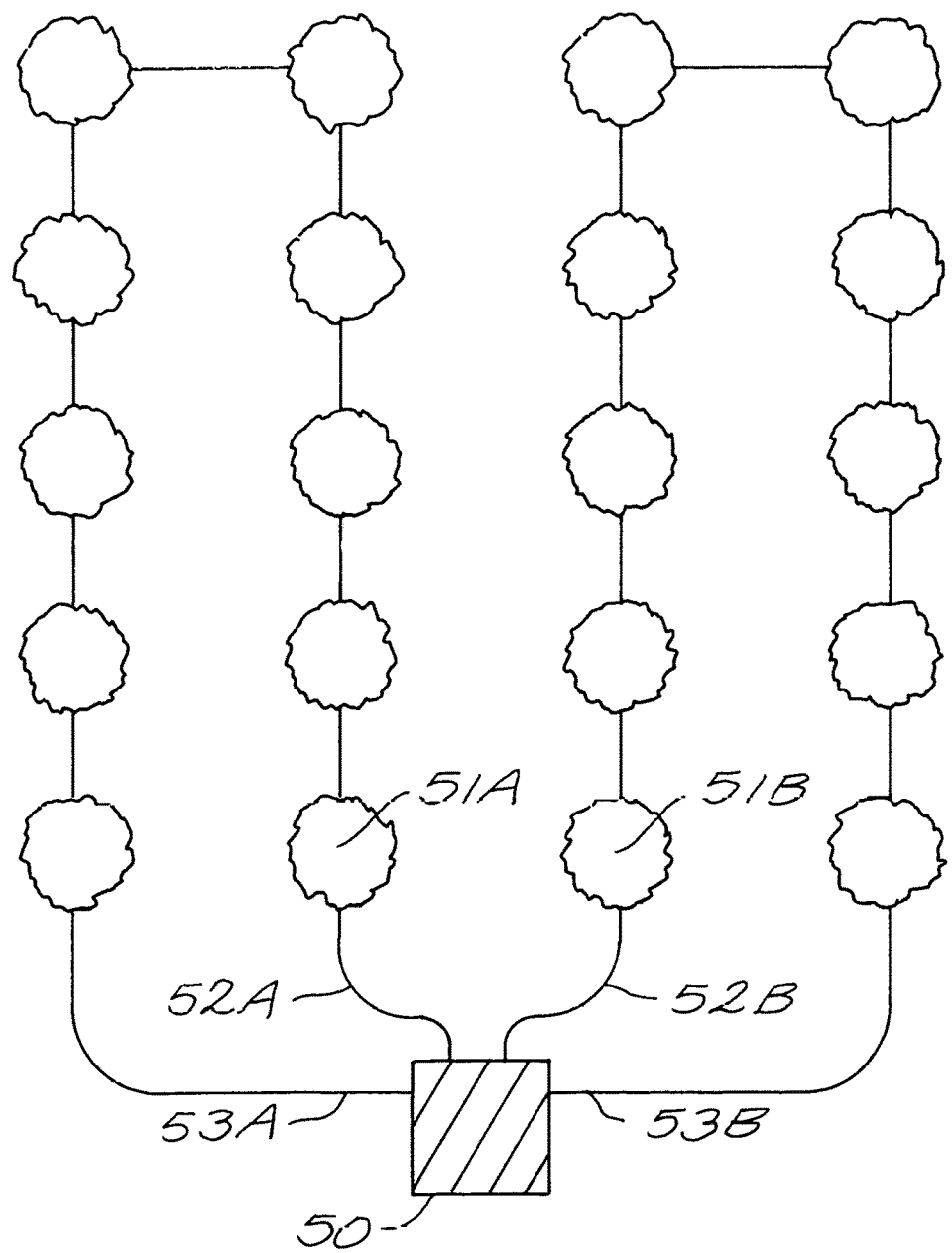
FIG. 5 is a top view of the piping arrangement for a citrus field.

FIG. 5 is a top view of the piping arrangement for a citrus field. The field of trees has been "broken" into groups 51A and 51B. Pipes 52A and 52B address the different groups of trees. Housing 50 (as outlined above) communicates water to a selected pipe (52A or 52B) allowing the water to seep through the pipe. Excess water (53A and 54B) is delivered to housing 50 for depositing into the aquafer as outed above.

It is clear that this invention provides for an efficient mechanism for the irrigation of plants using minimal water.

What is claimed is:

1. An irrigation system comprising:
   a) a first array of underground pipes having an open first end and having water permeable sections along the length;
   b) a first barrier to water positioned between the first array of underground pipes and a soil surface, said first barrier to water:
      1) substantially curtailing water flow to the soil surface; and,
      2) allowing roots to pass therethrough;
   c) a second array of underground pipes having an open first end lying deeper than the first array of underground pipes;
   d) a second barrier to water located between the first array of underground pipes and the second array of underground pipes; and,
   e) a water source providing water to the first end of the first array of underground pipes.

2. The Irrigation system according to claim 1, wherein each of the pipes has sections being water impermeable and wherein the permeable sections are each located proximal to roots of a chosen plant.

3. The irrigation system according to claim 1, wherein the water permeable sections include sealed clay pots, and wherein walls of the sealed clay pots are water permeable.

4. The irrigation system according to claim 1, wherein the water source includes a water pump drawing water from an aquifer.

5. The irrigation system according to claim 4, wherein each pipe in the first array of underground pipes, has an open second end which empties into the aquifer.

6. The irrigation system according to claim 4, wherein the first barrier to water includes a water absorbing polymer.

7. The irrigation system according to claim 4, wherein totality of the claimed components of the irrigation system is positioned below a the soil surface.

8. The irrigation system according to claim 7, wherein the water source includes:
   a) a water pump drawing water from an aquifer and wherein the water pump lies totally below the soil surface; and,
   b) a valving system adapted to selectively communicate water from the water pump to one of the first or second array of underground pipes.

9. The irrigation system according to claim 8, further including a fertilizer dispenser communicating with the valving system to communicate fertilizer therefrom to the underground pipe.

10. An irrigation system comprising:
    a) at least one underground pipe, each of said at least one underground pipe having,
       1) an open first end, and,
       2) water permeable sections therein;
    b) a first barrier to water positioned between the at least one underground pipe and a soil surface, said first barrier to water:
       1) substantially curtailing water flow to the soil surface, and,
       2) allowing roots to pass therethrough;
    c) a second underground pipe having an open first end lying deeper than the first array of underground pipes;
    d) a second barrier to water located between the first underground pipes and the second underground pipe; and,
    e) a water source providing water to a selected one of the first end of the underground pipes.

11. The irrigation system according to claim 10, further including at least one intermediate barrier to water interposed between neighboring at least one underground pipes.

12. The irrigation system according to claim 11, wherein the first barrier to water includes a water absorbing polymer.

13. The irrigation system according to claim 12, wherein,
    a) the water source includes a water pump drawing water from an aquifer; and
    b) each of the at least one underground pipes communicate with the aquifer.

14. The irrigation system according to claim 13, wherein the water source includes a valving system adapted to selectively communicate water from the water pump to a selected group of the at least one underground pipes.

15. An irrigation system comprising:
    a) an underground housing;
    b) at least two underground pipes extending from the underground housing and at least two underground pipes adapted to secrete water through walls of the pipe, a first end of each pipe and a second end of each pipe being accessible within the housing;
    c) at least two barriers to water adapted to curtail waterflow therethrough, an upper most barrier positioned between an upper most underground pipe and a soil surface, all remaining barriers positioned between underground pipes;
    d) a water pump located within the underground housing and adapted to draw water from an aquifer to a selected first end of the underground pipes, all of the second ends of the at least two underground pipes communicating with the aquifer; and,
    e) a control mechanism located within the underground housing for selective activation of the water pump and selective communication of water to a selected first end of the underground pipes.

16. The irrigation system according to claim 15, further including a solar electric collectors delivering to the water pump and the control mechanism.

17. The irrigation system according to claim 16, further including an above ground operator panel for directing operation of the control mechanism.

18. The irrigation system according to claim 15, wherein the first barrier to water includes a water absorbing polymer.

* * * * *